US012337830B2

(12) United States Patent
Name et al.

(10) Patent No.: US 12,337,830 B2
(45) Date of Patent: Jun. 24, 2025

(54) PARKING ASSIST SYSTEMS AND METHODS

(71) Applicant: Ford Global Technologies, LLC, Dearborn, MI (US)

(72) Inventors: Sari Alejandra Name, Mexico City (MX); Federico Emilio Mejia, Huixquilucan (MX)

(*) Notice: Subject to any disclaimer, the term of this patent is extended or adjusted under 35 U.S.C. 154(b) by 105 days.

(21) Appl. No.: 18/471,495

(22) Filed: Sep. 21, 2023

(65) Prior Publication Data

US 2025/0100545 A1    Mar. 27, 2025

(51) Int. Cl.
*B60W 30/06*    (2006.01)

(52) U.S. Cl.
CPC ....... *B60W 30/06* (2013.01); *B60W 2420/403* (2013.01); *B60W 2554/20* (2020.02); *B60W 2554/806* (2020.02); *B60W 2754/70* (2020.02)

(58) Field of Classification Search
CPC .......... B60W 30/06; B60W 2420/403; B60W 2554/20; B60W 2554/806; B60W 2754/70
See application file for complete search history.

(56) References Cited

U.S. PATENT DOCUMENTS

| | | | | |
|---|---|---|---|---|
| 6,107,942 | A * | 8/2000 | Yoo | G08G 1/14 340/687 |
| 8,300,889 | B2 * | 10/2012 | Jung | G06V 20/588 701/28 |
| 9,102,330 | B2 * | 8/2015 | Beaurepaire | B60W 30/06 |
| 10,308,243 | B2 | 6/2019 | Lavoie | |
| 11,136,022 | B2 * | 10/2021 | Matta | G06V 20/582 |
| 11,214,976 | B2 * | 1/2022 | Cho | E04H 6/305 |
| 11,907,976 | B2 * | 2/2024 | Rosas-Maxemin | G06N 20/00 |
| 12,018,953 | B2 * | 6/2024 | Bradlow | B62J 50/22 |
| 2013/0085596 | A1 | 4/2013 | Shani | |
| 2021/0114586 | A1 * | 4/2021 | Graefe | G08G 1/147 |
| 2021/0179087 | A1 | 6/2021 | Tsujino et al. | |
| 2024/0270236 | A1 * | 8/2024 | Ghannam | B60W 30/06 |

FOREIGN PATENT DOCUMENTS

WO    2008098584 A1    8/2008

OTHER PUBLICATIONS

Vipul More, et al., Automatic Car Parking System Using RFID, https://www.researchgate.net/publication/357910508, Jan. 18, 2022, pp. 5079-5085, vol. 3 Issue 2017.

* cited by examiner

*Primary Examiner* — John A Tweel, Jr.
(74) *Attorney, Agent, or Firm* — Eversheds Sutherland (US) LLP; Frank Lollo

(57) ABSTRACT

A vehicle parking assist system is disclosed. The system may include a detection unit configured to detect real-time presence, position, and orientation of a plurality of markers disposed on a parking space with respect to a vehicle. The system may further include a memory configured to store a historical vehicle movement pattern associated with the vehicle relative to the plurality of markers to park the vehicle in the parking space. The system may further include a processor configured to obtain a request to park the vehicle in the parking space. Responsive to obtaining the request, the processor may obtain the historical vehicle movement pattern and the real-time inputs. Based on the historical vehicle movement pattern and the real-time inputs, the processor may cause a vehicle movement to park the vehicle in the parking space.

20 Claims, 5 Drawing Sheets

PARKING ASSIST SYSTEMS AND METHODS

FIELD

The present disclosure relates to systems and methods for providing parking assistance to park vehicle in a parking facility.

BACKGROUND

Parking a vehicle in a parking space (e.g., in a parking lift) or a narrow/tight parking space may be challenging for a vehicle operator. For example, the vehicle operator may face inconvenience in parking the vehicle when the parking space is small or when the vehicle is large (e.g., a Sport utility vehicle (SUV)). In such scenarios, the vehicle operator may make multiple back and forth vehicle movements, steering rotations, maneuvers, etc., to park the vehicle optimally.

Performing such vehicle movements and maneuvers to park the vehicle may be inconvenient and taxing for the vehicle operator. In some scenarios, such vehicle movements may lead to a vehicle dent as well. In addition, when the vehicle is parked in the parking space (e.g., after such vehicle movements), it may be challenging for a user to get out of the vehicle.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
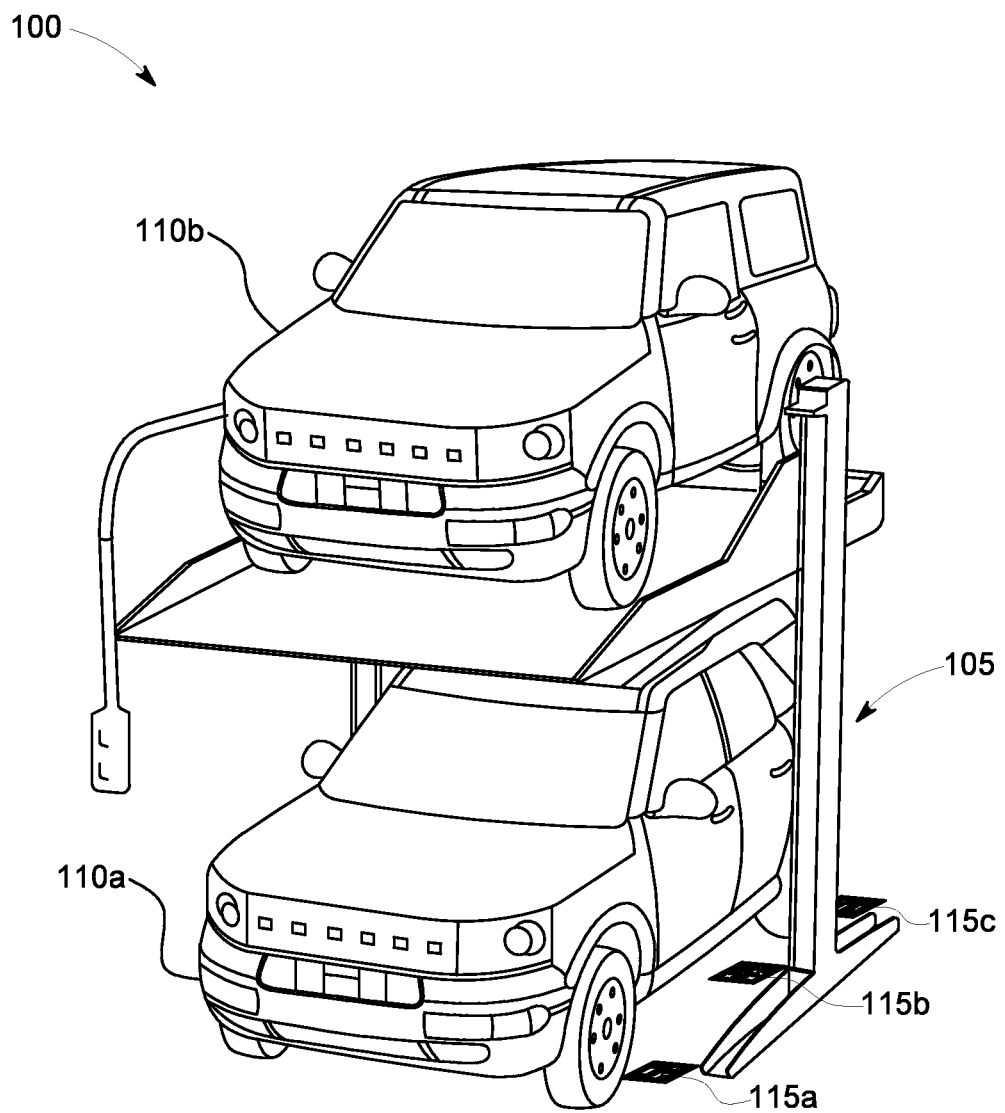
FIG. 1 depicts an environment in which techniques and structures for providing the systems and methods disclosed herein may be implemented.

The present disclosure describes a vehicle parking assistance system ("system") that may be configured to provide assistance to park a vehicle inside a parking facility. The system may be configured to provide assistance to park the vehicle by using a plurality of markers that may be disposed in the parking facility. The system may be configured to "memorize" or store historical vehicle movement pattern associated with the vehicle relative to the markers when the vehicle may have been historically parked in the parking facility by a vehicle operator. The system may be configured to use the historical vehicle movement pattern to autonomously perform the vehicle parking in the parking facility.

In some aspects, the historical vehicle movement pattern may include historical presence, position, and orientation of the markers relative to the vehicle, e.g., when the vehicle operator may have historically parked the vehicle in the parking facility with the markers.

In some aspects, the system may perform autonomous vehicle parking when the system receives a request from a user to park the vehicle in the parking facility. Responsive to receiving the request, the system may obtain real-time inputs from a vehicle detection unit. The real-time inputs may include real-time presence, position, and orientation of the markers in the parking facility, e.g., relative to the vehicle. Responsive to obtaining the real-time inputs, the system may compare the real-time inputs with the historical vehicle movement pattern and calculate or estimate a vehicle real-time location/position relative to the markers based on the comparison. The system may further cause the vehicle to autonomously move and park in the parking facility based on the vehicle real-time location/position relative to the markers.

In some aspects, the plurality of markers may be marker tags or stickers that may be disposed on ground in the parking facility. Each marker may include a unique pattern and may be associated with an identifier. The vehicle detection unit may be configured to detect each marker and may enable the system to autonomously park the vehicle in the vehicle parking slot based on the detection.

The systems and methods described herein may provide various advantages. For example, the system may be configured to memorize the pattern of vehicle movement inside the parking facility, which may enable the vehicle to perform self-parking in the parking facility conveniently. Thus, the system facilitates the vehicle operator to park the vehicle conveniently and autonomously. The system may be particularly beneficial for the user when the vehicle may be required to be parked in a narrow parking slot in the parking facility.

The other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an example environment 100 in which techniques and structures for providing the systems and methods disclosed herein may be implemented. The environment 100 that may include a parking facility 105 and vehicles 110a, 110b (collectively referred to as a vehicle 110). The parking facility 105 may be a parking lift (as shown in FIG. 1) or any other similar parking space (e.g., a narrow parking space) that may accommodate one or more vehicles. In some aspects, the parking facility 105 may include a plurality of parking lifts.

The vehicle 110 may take the form of any passenger or commercial vehicle such as, for example, a car, a work vehicle, a crossover vehicle, a van, a minivan, a taxi, a bus, etc. Further, the vehicle 110 may be a manually driven vehicle and/or may be configured to operate in an autonomous mode (e.g., partially or fully autonomous mode) and may include any powertrain such as, for example, a gasoline engine, one or more electrically-actuated motor(s), a hybrid system, etc.

The environment 100 may further include a plurality of markers 115a, 115b, 115c, etc. (hereinafter referred as the plurality of markers 115). The markers 115 may be tags or stickers that may be disposed on ground in the parking facility 105 (e.g., at specific positions). The markers 115 may be positioned in proximity to a vehicle parking slot periphery or boundary in the parking facility 105, which may facilitate the vehicle 110 to park itself autonomously in the vehicle parking slot. In some aspects, there may be at least six markers that may facilitate the vehicle 110 to park itself in the vehicle parking slot. In some aspects, the markers 115 may be Augmented Reality University of Cordoba (ArUco) markers that may include a wide black border and inner binary matrix which defines/determines marker's identifier (id).

Figure 2:
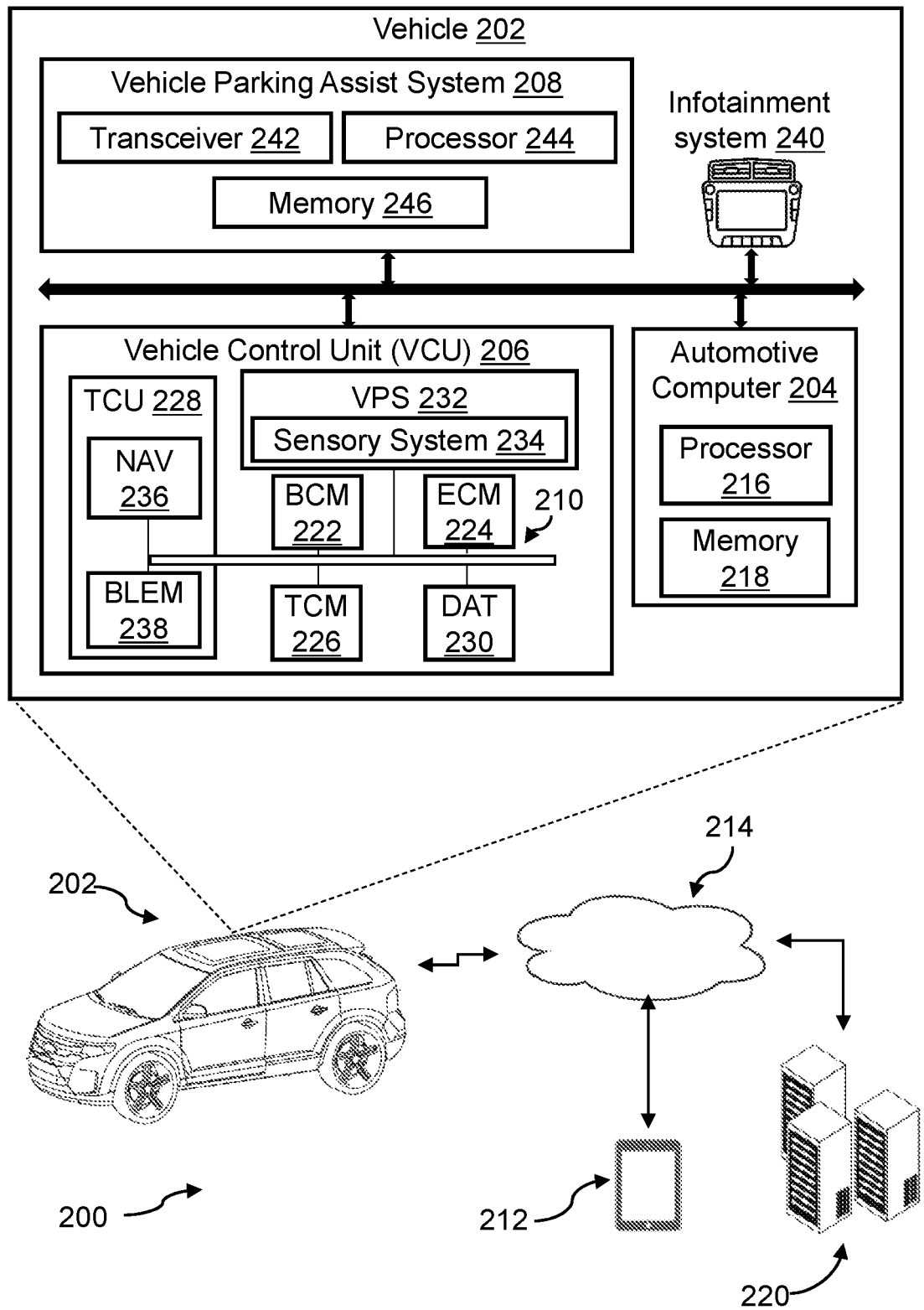
FIG. 2 illustrates a block diagram of a system for providing vehicle parking assistance in accordance with the present disclosure.

The environment 100 may additionally include a vehicle parking assist system ("system", shown as vehicle parking assist system 208 in FIG. 2). In some aspects, the system may be located in the vehicle 110 (e.g., as part of an on-board vehicle computer) and may be configured to enable vehicle self-parking in the parking facility 105 by using the markers 115. Stated another way, the system may enable autonomous vehicle parking by using the markers 115. In some aspects, the system may include a detection unit (that may be, e.g., a vehicle camera) that may be configured to detect real-time presence, position, and orientation of the markers 115 in the parking facility, e.g., relative to the vehicle 110. In addition, the system may include a processor (e.g., shown as processor 244 in FIG. 2) that may be configured to obtain inputs from the detection unit and cause an autonomous vehicle movement to park the vehicle 110 in the parking facility 105 based on the obtained inputs.

In further aspects, the system may be configured to "memorize" or store (e.g., in a system memory, shown as memory 246 in FIG. 2) historical vehicle movement pattern associated with the vehicle 110 relative to the markers 115 when the vehicle 110 may have been historically parked in the parking facility 105. In some aspects, the historical vehicle movement pattern may include historical presence, position, and orientation of the markers 115 relative to the vehicle 110, e.g., when a vehicle operator may have historically parked the vehicle 110 in the vehicle parking slot of the parking facility 105 with the markers 115 disposed on the ground in proximity to the vehicle parking slot. Stated another way, the system may be configured to "learn" over time relative position and orientation of the markers 115 when the vehicle operator parks the vehicle 110 in the parking facility 105. The system may use the "learning" or the stored historical vehicle movement pattern relative to the markers 115 to enable autonomous vehicle movement to park the vehicle 110 in the vehicle parking slot.

During operation, when the vehicle operator reaches the parking facility 105, the vehicle operator may move out of the vehicle 110 and may request the vehicle 110 (or the system via a user device or a key fob or a vehicle Human-Machine Interface (HMI)) to autonomous park itself in the vehicle parking slot in the parking facility 105. Responsive to the system receiving the request from the vehicle operator to park the vehicle 110 in the vehicle slot, the system may retrieve the historical vehicle movement pattern from the system memory. The system may further obtain real-time inputs from the detection unit. The system may then compare the historical vehicle movement pattern with the real-time inputs and may cause an autonomous vehicle movement to park the vehicle 110 in the parking facility 105 based on the comparison.

As an example, the system may detect real-time position (e.g., coordinates) and orientation (e.g., an angle relative to the vehicle 110) of each marker via the detection unit and may compare the real-time position and orientation with historical position and orientation of each marker relative to the vehicle 110 when the vehicle 110 may have been parked in the vehicle parking slot. Based on the comparison, the system may estimate or calculate real-time vehicle position relative to each marker. Responsive to calculating the vehicle position, the system may cause the vehicle movement to park the vehicle 110 in the parking facility 105.

In some aspects, the system may perform the above-described steps multiple times or repeat the above-described steps at different vehicle positions till the vehicle 110 is completely or fully parked in the vehicle parking slot in the parking facility 105. In this manner, the use of such markers 115 assist the system to perform autonomous vehicle parking.

In some aspects, the system (e.g., the processor) may be additionally configured to facilitate the vehicle operator to determine appropriate positions in proximity to or around the vehicle parking slot periphery on which the vehicle operator may place/paste the markers 115. In this case, the system may be configured to determine an appropriate location/position for each marker to be placed on the ground in the parking facility 105 (e.g., based on historical vehicle movement pattern) and may transmit information associated with the determined marker locations to a user interface (e.g., a mobile device 212 or an infotainment system 240 shown in FIG. 2) so that the vehicle operator may accordingly place the markers 115 at the determined marked locations. Further details of the system are described below in conjunction with FIG. 2.

The vehicle 110, the system and the vehicle operator implement and/or perform operations, as described here in the present disclosure, in accordance with the owner manual and safety guidelines. In addition, any action taken by the vehicle operator based on recommendations or notifications provided by the vehicle 110 and/or the system should comply with all the rules specific to the location and operation of the vehicle 110 (e.g., Federal, state, country, city, etc.). The recommendation or notifications, as provided by the vehicle 110 and/or the system, should be treated as suggestions and only followed according to any rules specific to the location and operation of the vehicle 110.

Figure 3:
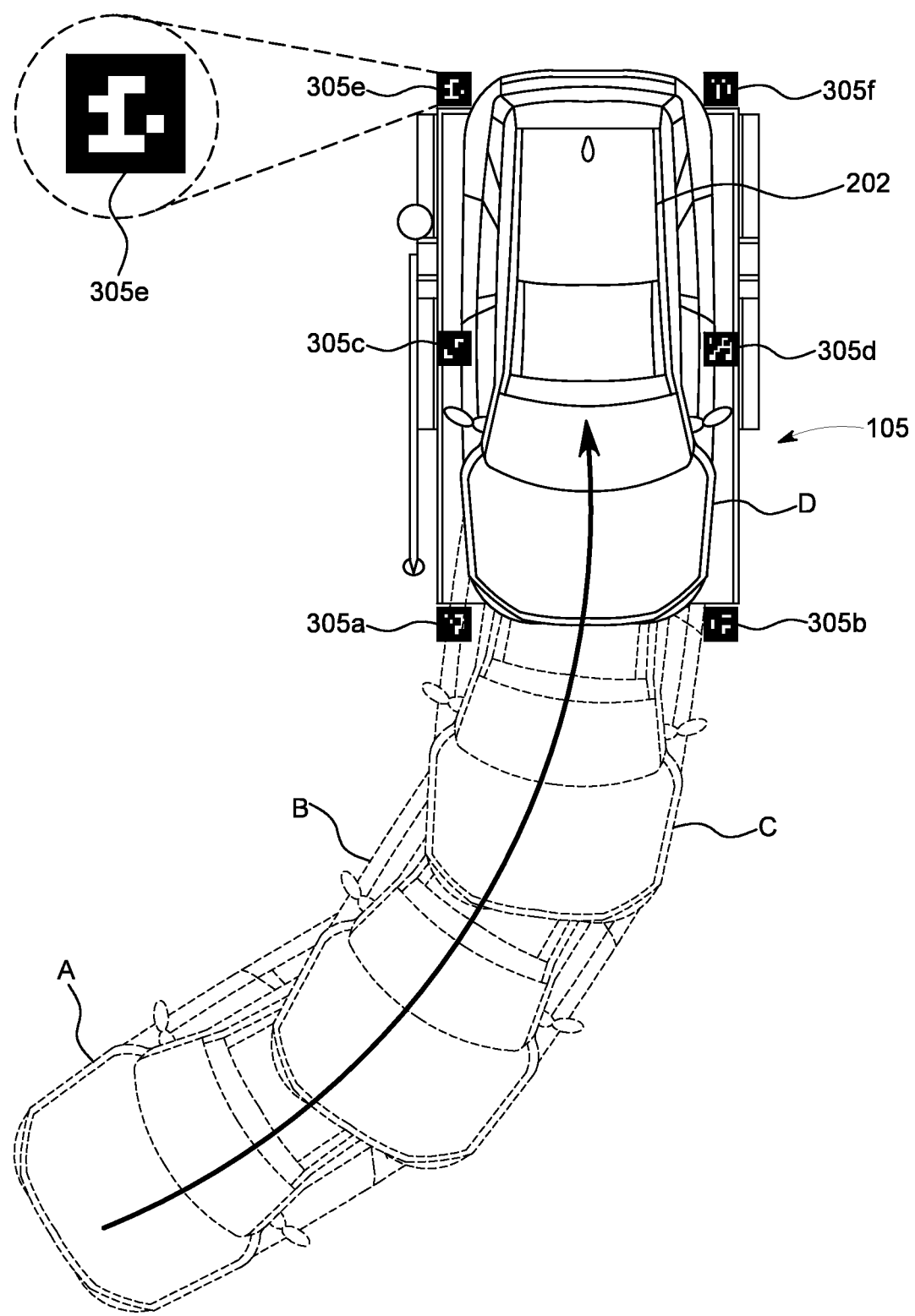
FIG. 3 illustrates a snapshot of a vehicle movement in a parking facility in accordance with the present disclosure.

FIG. 2 illustrates a block diagram of an example system 200 for providing vehicle parking assistance, in accordance with the present disclosure. FIG. 2 will be explained in conjunction with FIG. 3. FIG. 3 illustrates an example snapshot of a vehicle movement in the parking facility 105, in accordance with the present disclosure.

The system 200 may include a vehicle 202, which may be same as the vehicle 110. The vehicle 202 may include an automotive computer 204, a Vehicle Control Unit (VCU) 206, and a vehicle parking assist system 208 (same as the vehicle parking assist system described above in conjunction with FIG. 1). The VCU 206 may include a plurality of Electronic Control Units (ECUs) 210 disposed in communication with the automotive computer 204.

The system 200 may further include a mobile device 212 that may connect with the automotive computer 204 and/or the vehicle remote parking assist system 208 by using wired and/or wireless communication protocols and transceivers. In some aspects, the mobile device 212 may be associated with a vehicle user/operator (not shown). The mobile device 212 may communicatively couple with the vehicle 202 via one or more network(s) 214, which may communicate via one or more wireless connection(s), and/or may connect with the vehicle 202 directly by using near field communication (NFC) protocols, Bluetooth® protocols, Wi-Fi, Ultra-Wideband (UWB), and other possible data connection and sharing techniques.

The network(s) 214 illustrates an example communication infrastructure in which the connected devices discussed in various embodiments of this disclosure may communicate. The network(s) 214 may be and/or include the Internet, a private network, public network or other configuration that operates using any one or more known communication protocols such as, for example, transmission control protocol/Internet protocol (TCP/IP), Bluetooth®, BLE®, Wi-Fi based on the Institute of Electrical and Electronics Engineers (IEEE) standard 802.11, UWB, and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

In some aspects, the automotive computer 204 and/or the vehicle parking assist system 208 may be installed anywhere in the vehicle 202. Further, the automotive computer 204 may operate as a functional part of the vehicle parking assist system 208. The automotive computer 204 may be or include an electronic vehicle controller, having one or more processor(s) 216 and a memory 218. Moreover, the vehicle parking assist system 208 may be separate from the automotive computer 204 (as shown in FIG. 2) or may be integrated as part of the automotive computer 204.

The processor(s) 216 may be disposed in communication with one or more memory devices disposed in communication with the respective computing systems (e.g., the memory 218 and/or one or more external databases not shown in FIG. 2). The processor(s) 216 may utilize the memory 218 to store programs in code and/or to store data for performing operations in accordance with the disclosure. The memory 218 may be a non-transitory computer-readable medium or memory storing a parking assistance program code. The memory 218 may include any one or a combination of volatile memory elements (e.g., dynamic random-access memory (DRAM), synchronous dynamic random-access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.).

In some aspects, the automotive computer 204 and/or the vehicle parking assist system 208 may be disposed in communication with one or more server(s) 220 and the mobile device 212. In some aspects, the server(s) 220 may be part of a cloud-based computing infrastructure and may be associated with and/or include a Telematics Service Delivery Network (SDN) that provides digital data services to the vehicle 202 and other vehicles (not shown in FIG. 2) that may be part of a vehicle fleet. In other aspects, the server 220 may be a third-party server that may be configured to store vehicle information (such as vehicle usage behavior or historical usage information associated with the vehicle 202). For example, the server 220 may store information associated with a usual or typical parking location in the parking facility 105 where the vehicle 202 may be generally parked, historical vehicle movement pattern in the parking facility 105 from a parking facility entry point to the usual parking location, and/or the like. The server 220 may be further configured to transmit the above-mentioned information to the vehicle 202 for storage purpose.

In accordance with some aspects, the VCU 206 may share a power bus with the automotive computer 204 and may be configured and/or programmed to coordinate the data between vehicle 202 systems, connected servers (e.g., the server(s) 220), and other vehicles (not shown in FIG. 2) operating as part of a vehicle fleet. The VCU 206 can include or communicate with any combination of the ECUs 210, such as, for example, a Body Control Module (BCM) 222, an Engine Control Module (ECM) 224, a Transmission Control Module (TCM) 226, a telematics control unit (TCU) 228, a Driver Assistances Technologies (DAT) controller 230, etc. The VCU 206 may further include and/or communicate with a Vehicle Perception System (VPS) 232, having connectivity with and/or control of one or more vehicle sensory system(s) 234. The vehicle sensory system 234 may include one or more vehicle sensors including, but not limited to, a Radio Detection and Ranging (RADAR or "radar") sensor configured for detection and localization of objects inside and outside the vehicle 202 using radio waves, sitting area buckle sensors, sitting area sensors, a Light Detecting and Ranging (LiDAR or "lidar") sensor, door sensors, proximity sensors, temperature sensors, wheel sensors, vehicle camera(s) (e.g., interior camera and exterior camera), etc. The vehicle cameras may be same as the detection unit described above in conjunction with FIG. 1.

In some aspects, the VCU 206 may control the vehicle operational aspects and implement one or more instruction sets received from the mobile device 212, from one or more instruction sets stored in the memory 218, including instructions operational as part of the vehicle parking assist system 208.

The TCU 228 can be configured and/or programmed to provide vehicle connectivity to wireless computing systems onboard and off board the vehicle 202 and may include a Navigation (NAV) receiver 236 for receiving and processing a GPS signal, a BLE® Module (BLEM) 238 or BUN (BLE, UWB, NFC module), a Wi-Fi transceiver, a UWB transceiver, and/or other wireless transceivers (not shown in FIG. 2) that may be configurable for wireless communication (including cellular communication) between the vehicle 202 and other systems (e.g., a vehicle key fob, not shown in FIG. 2), computers, and modules. The TCU 228 may be disposed in communication with the ECUs 210 by way of a bus.

In one aspect, the ECUs 210 may control aspects of vehicle operation and communication using inputs from human drivers, inputs from an autonomous vehicle controller, the vehicle parking assist system 208, and/or via wireless signal inputs received via the wireless connection(s) from other connected devices, such as the mobile device 212, the server(s) 220, among others. In some aspects, the ECUs 210 may be configured to control vehicle movement based on instructions provided by the vehicle parking assist system 208.

The BCM 222 generally includes integration of sensors, vehicle performance indicators, and variable reactors associated with vehicle systems and may include processor-based power distribution circuitry that may control functions associated with the vehicle body such as lights, windows, security, camera(s), audio system(s), speakers, door locks and access control, vehicle energy management, and various comfort controls. The BCM 222 may also operate as a gateway for bus and network interfaces to interact with remote ECUs (not shown in FIG. 2).

In some aspects, the DAT controller 230 may provide Level-1 through Level-3 automated driving and driver assistance functionality that can include, for example, active parking assistance, trailer backup assistance, adaptive cruise control, lane keeping, and/or driver status monitoring, among other features.

In some aspects, the automotive computer 204 may connect with an infotainment system 240 (or vehicle HMI) that may include a touchscreen interface portion and may include voice recognition features, biometric identification capabilities that can identify users based on facial recognition, voice recognition, fingerprint identification, or other biological identification means. In other aspects, the infotainment system 240 may be further configured to receive user instructions via the touchscreen interface portion and/or display notifications, navigation maps, etc. on the touchscreen interface portion.

The computing system architecture of the automotive computer 204, the VCU 206, and/or the vehicle parking assist system 208 may omit certain computing modules. It should be readily understood that the computing environment depicted in FIG. 2 is an example of a possible implementation according to the present disclosure, and thus, it should not be considered limiting or exclusive.

In accordance with some aspects, the vehicle parking assist system 208 may be integrated with and/or executed as part of the ECUs 210. The vehicle parking assist system 208, regardless of whether it is integrated with the automotive computer 204 or the ECUs 210, or whether it operates as an independent computing system in the vehicle 202, may include a transceiver 242, a processor 244, and a computer-readable memory 246. The transceiver 242 may be configured to receive information/inputs from external devices or systems, e.g., the mobile device 212, the server 220 (such as the vehicle usage behavior or the historical usage information associated with the vehicle 202, which includes the historical vehicle movement pattern), and/or the like. Further, the transceiver 242 may transmit notifications/request (e.g., request to provide additional inputs) to the external devices or systems. In addition, the transceiver 242 may be configured to receive information/inputs from vehicle components such as the infotainment system 240, the vehicle sensory system 234 including the detection unit (vehicle cameras), and/or the like. Further, the transceiver 242 may transmit notifications (e.g., alert/alarm signals, vehicle remote parking assistance instructions, etc.) to the vehicle components such as the VCU 206.

The processor 244 and the memory 246 may be same as or similar to the processor 216 and the memory 218, respectively. Specifically, the processor 244 may utilize the memory 246 to store programs in code and/or to store data for performing aspects in accordance with the disclosure. The memory 246 may be a non-transitory computer-readable memory or medium storing the remote parking assistance program code.

In some aspects, the memory 246 may store information associated with a plurality of markers 305a, 305b, 305c, 305d, 305e, 305f (collectively referred as the plurality of markers 305) shown in FIG. 3. The markers 305 may be same as the markers 115 described above in conjunction with FIG. 1. The information associated with the markers 305 may include, but is not limited to, identifier of each marker, location of each marker in the parking facility 105, and/or the like. For example, the memory 246 may store information that indicates that the markers 305a and 305b are front markers and are placed in a vehicle parking slot front portion in the parking facility 105, the markers 305c and 305d are middle markers and are placed in a vehicle parking slot middle portion in the parking facility 105, and the markers 305e and 305f are rear markers and are placed in a vehicle parking slot rear portion in the parking facility 105, and/or the like (as depicted in FIG. 3). In addition, the memory 246 may store identifiers or unique pattern associated with each of the front markers 305a, 305b, the middle markers 305c. 305d, and the rear markers 305c, 305f.

In some aspects, the processor 244 may be an Artificial Intelligence (AI)-based processor that may use a neural network model (not shown) to execute vehicle parking assist system operation. The neural network model may be stored in the memory 246. The neural network model may be a supervised neural network model that may analyze the video feeds from the vehicle camera/detection unit (and/or other inputs from the vehicle sensory system 234 such as radar, lidar, etc.), when the vehicle operator parks the vehicle 202 in the parking facility 105. Responsive to analyzing the video feed and the inputs described above, the neural network model may determine a typical movement pattern associated with the vehicle 202 relative to the markers 305 during parking maneuver (or when the vehicle 202 parks) and may generate a training model of typical vehicle movement in the parking facility 105 relative to the markers 305. For example, the neural network model may regularly monitor the vehicle movement from a parking facility entry point to the vehicle parking slot in the parking facility 105 relative to the markers 305 and generate the training model based on the monitored vehicle movement. As an example, the neural network may determine presence, position, and/or orientation of the markers 305 relative to the vehicle 202 when the vehicle 202 moves from the parking facility entry point to the vehicle parking slot, and accordingly generate (and continuously update) the training model described above. The processor 244 may store the generated training model (or a "trained" model of vehicle movement) in the memory 246.

In one or more aspects, the neural network model may include electronic data, which may be implemented, for example, as a software component, and may rely on code databases, libraries, scripts, or other logic or instructions for execution of a neural network algorithm by the processor 244. The neural network model may be implemented as code and routines configured to enable a computing device, such as the vehicle parking assist system 208, to perform one or more operations. In some aspects, the neural network model may be implemented using hardware including a processor, a microprocessor, a field-programmable gate array (FPGA), or an application-specific integrated circuit (ASIC). In other aspects, the neural network model may be implemented by using a combination of hardware and software.

Examples of the neural network model may include, but are not limited to, a deep neural network (DNN), a convolutional neural network (CNN), a recurrent neural network (RNN), a CNN-recurrent neural network (CNN-RNN), R-CNN, Fast R-CNN, Faster R-CNN, an artificial neural network (ANN), a Long Short Term Memory (LSTM) network based RNN, CNN+ANN, LSTM+ANN, a gated recurrent unit (GRU)-based RNN, a fully connected neural network, a deep Bayesian neural network, a Generative Adversarial Network (GAN), and/or a combination of such networks. In some aspects, the neural network model may include numerical computation techniques using data flow graphs. In one or more aspects, the neural network model may be based on a hybrid architecture of multiple Deep Neural Networks (DNNs).

In operation, when the vehicle 202 reaches the parking facility 105, the vehicle operator may leave the vehicle 202 in proximity to the vehicle parking slot in the parking facility 105 and may exit the vehicle 202. Further, the vehicle operator may transmit a request to the transceiver 242 to park the vehicle 202 in the vehicle parking slot. In some aspects, the vehicle operator may transmit the request via the mobile device 212 (that may be communicatively coupled to the vehicle 202). Alternatively, the vehicle operator may transmit the request via the infotainment system 240 (e.g., before exiting the vehicle 202), a key fob (not shown), and/or the like.

The transceiver 242 may receive the request (as a trigger signal) from at least one of: the mobile device 212, the infotainment system 240, the key fob, and/or the like. In other aspects, the transceiver 242 may receive the trigger signal from the VCU 206 when the vehicle 202 enters the parking facility 105 or when the vehicle 202 is in proximity to the parking facility entry point or the vehicle parking slot in the parking facility 105. In this case, the transceiver 242 may receive the trigger signal from the vehicle sensory system 234 (e.g., from vehicle cameras) and/or the TCU 228 (e.g., based on GPS signals). Responsive to receiving the request (or the trigger signal), the transceiver 242 may transmit the request to park the vehicle 202 to the processor 244.

The processor 244 may be configured to obtain the request from the transceiver 242. Responsive to obtaining the request, the processor 244 may obtain historical vehicle movement pattern from the memory 246. As described above, the historical vehicle movement pattern may include historical presence, position, and orientation of the markers 305 relative to the vehicle 202 when the vehicle 202 may have been historically parked in the vehicle parking slot in the parking facility 105. As an example, the processor 244 may obtain the historical vehicle movement pattern that includes historical presence, position, and orientation of each of the front markers 305a, 305b, the middle markers 305c, 305d, and the rear markers 305e, 305f with respect to the vehicle 202 when the vehicle 202 may have been historically parked in the vehicle parking slot.

In addition, the processor 244 may obtain real-time inputs from the vehicle sensory system 234 (i.e., the detection unit including the vehicle cameras). The real-time inputs may include real-time presence, position, and orientation of the markers 305 relative to the vehicle 202. For example, the processor 244 may obtain include real-time presence, position, and orientation of each of the front markers 305a, 305b, the middle markers 305c, 305d, and the rear markers 305e, 305f with respect to the vehicle 202.

Responsive to obtaining the historical vehicle movement pattern and the real-time inputs, the processor 244 may compare the historical presence, position, and orientation of the markers 305 relative to the vehicle 202 with the real-time presence, position, and orientation of the markers 305. Responsive to the comparison, the processor 244 may estimate or calculate a real-time vehicle position and/or a real-time vehicle orientation relative to the markers 305 based on the comparison.

For example, the processor 244 may determine real-time coordinates and orientation angle of each marker 305 relative to the vehicle 202 (e.g., with respect to a vehicle longitudinal axis) based on the real-time inputs obtained from the vehicle cameras. Responsive to determining the real-time coordinates and orientation angles of the markers 305 relative to the vehicle 202, the processor 244 may compare the real-time coordinates and orientation angles with the historical coordinates and orientation angle of the markers 305 at different vehicle positions (e.g., at position "A", position "B", position "C", position "D", etc.) relative to the vehicle parking slot, as shown in FIG. 3. Based on the comparison, the processor 244 may determine the current or real-time vehicle position (e.g., whether the vehicle 202 is at the position "A", "B", "C" or "D"). For example, when the processor 244 determines that that the detection unit/vehicle camera has detected the front markers 305a, 305b and not the rear markers 305e, 305f, the processor 244 may determine that the vehicle 202 may be at position "A" and not at positions "C" or "D" (at which the vehicle camera may detect the rear markers 305e, 305f).

Responsive to the processor 244 determining the current or real-time vehicle position/orientation, the processor 244 may cause the vehicle 202 to autonomously move to the vehicle parking slot (e.g., in the position "D") in the parking facility 105 based on the real-time vehicle position/orientation relative to the markers 305. In some aspects, the processor 244 may transmit instructions (e.g., parking or navigation instructions) to the VCU 206 to move the vehicle 202 from the position "A" (as an example) to the vehicle parking slot in the parking facility 105. The parking instructions may be based on the historical vehicle movement pattern so that the vehicle 202 may follow the same pattern to efficiently park the vehicle 202 in the vehicle parking slot. As an example, the historical vehicle movement pattern may indicate that the vehicle 202 should move from the position "A" to the position "B", then from the position "B" to the position "C", and then from the position "C" to the position "D" (i.e., the final parking position). The VCU 206 (specifically the ECUs 210) may receive the parking or navigation instructions from the processor 244 and may accordingly control the vehicle movement based on the instructions. The processor 244 may repeat the above-mentioned steps periodically or at a predefined frequency (e.g., every 0.1 sec or at different vehicle positions) to autonomously park the vehicle 202 in the vehicle parking slot.

In some aspects, responsive to obtaining the historical vehicle movement pattern, the processor 244 may determine whether the obtained information is sufficient to perform self or autonomous vehicle parking in the parking facility 105. The processor 244 may determine that the obtained information may not be sufficient, for example, when the vehicle operator may be parking the vehicle 202 the first time in the parking facility 105 or has parked the vehicle 202 in the parking facility 105 below a threshold count of times.

Responsive to determining that the obtained information may not be sufficient, in some aspects, the processor 244 may request or transmit a notification (via the mobile device 212 or the infotainment system 240) to the vehicle operator to park the vehicle 202 manually so that the processor 244 (specifically, the neural network model) may "learn" vehicle movement pattern/steps and build the trained model described above. Responsive to receiving the request from the processor 244, the vehicle operator may manually park the vehicle 202 or provide inputs to the vehicle 202 (e.g., via vehicle steering wheel, push button on dashboard or the infotainment system 240, or the mobile device 212) and park the vehicle 202 in the parking facility 105. The processor 244 may learn, via the neural network model, the vehicle operator inputs over time and may store the learning (or the trained model) as the vehicle information in the memory 246/server 220 to perform self-parking in the future.

On the other hand, when the processor 244 determines that the historical vehicle movement pattern may be sufficient to perform the autonomous vehicle parking, the processor 244 may generate instructions (e.g., the parking instructions) for the vehicle 202, as described above. For example, the processor 244 may generate the instructions to move the vehicle 202 from a point/location where the vehicle operator may have left or exited the vehicle 202 (i.e., in proximity to the vehicle parking slot) to the vehicle parking slot in the parking facility 105.

In further aspects, the processor 244 may be configured to determine that a predetermined condition may be met during the vehicle movement when the vehicle parking assist system 208 is unable to park the vehicle 202 in the parking facility 105 by using the historical vehicle movement pattern. In an exemplary aspect, the processor 244 may determine that the vehicle parking assist system 208 is unable to park the vehicle 202 in the parking facility 105 if a marker may be misplaced or not detected. Responsive to such determination, the processor 244 may transmit a notification to the mobile device 212 requesting the vehicle operator to provide parking assistance (e.g., perform manual parking) to enable vehicle parking in the parking facility 105 by the processor 244 in the future. In additional or alternative aspects, the processor 244 may provide other indications to the vehicle operator, for example, by blinking vehicle lights in a predefined pattern, to indicate to the vehicle operator that the vehicle parking assist system 208 is unable to park the vehicle 202 in the parking facility 105.

In further aspects, the processor 244 may be configured to detect presence of an object (e.g., a parking facility structure, another vehicle, an animal, etc.) in proximity to the vehicle 202 during vehicle movement. In some aspects, the processor 244 may monitor and detect the object presence based on the real-time inputs obtained from the detection unit/vehicle cameras. Responsive to detecting the object presence, the processor 244 may update vehicle movement such that the vehicle 202 may prevent adverse instances while parking the vehicle 202 in the parking facility 105. In this case, the processor 244 may additionally transmit a request to the mobile device 212 and/or the infotainment system 240, requesting the vehicle operator to remove the object from vehicle's path.

In additional aspects, the processor 244 may determine requirement of additional markers in the parking facility 105 to enable the processor 244 to perform vehicle self-parking efficiently and may transmit a request to the mobile device 212 (or any other user interface) requesting the vehicle operator to place the additional markers in the parking facility 105. In addition, the processor 244 may be configured to determine optimum locations in the parking facility 105 to place the additional markers (e.g., based on the historical vehicle movement pattern) and transmit information associated with the determined locations to the mobile device 212. In some aspects, the processor 244 may transmit the request to place the additional markers in the parking facility 105 when the vehicle parking assist system 208 may be unable to park the vehicle 202 in the parking facility 105 based on the historical vehicle movement pattern, as described above.

Figure 4:
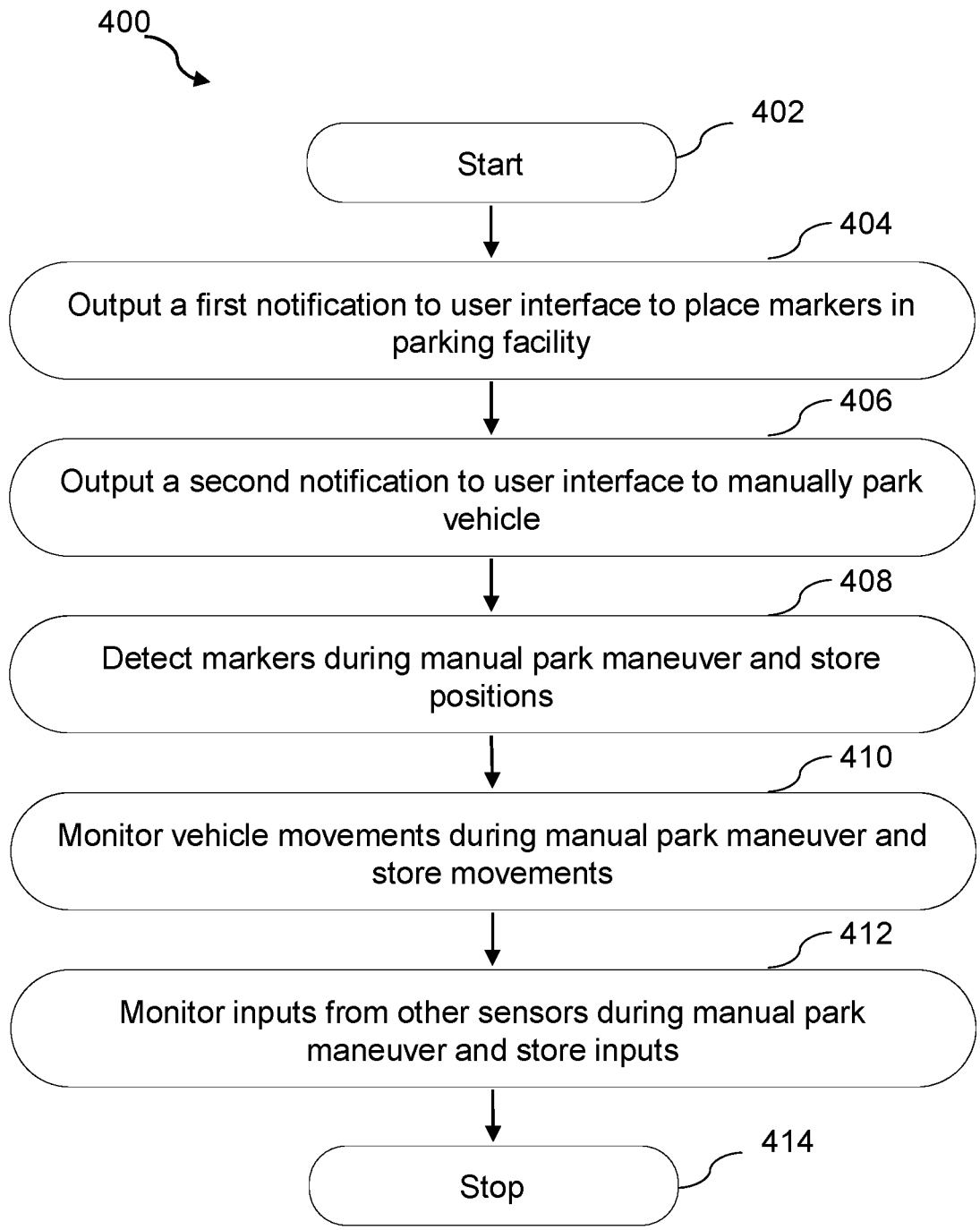
FIG. 4 depicts a flow diagram of a first method for providing vehicle parking assistance in accordance with the present disclosure.

FIG. 4 depicts a flow diagram of a first example method 400 for providing vehicle parking assistance, in accordance with the present disclosure. Specifically, FIG. 4 describes a learning process for the processor 244 to build the training/trained module described above. In some aspects, the processor 244 begins the learning process responsive to receiving a request/trigger signal from the mobile device 212, the infotainment system 240, and/or the like. FIG. 4 may be described with continued reference to prior figures, including FIGS. 1-3. The following process is exemplary and not confined to the steps described hereafter. Moreover, alternative embodiments may include more or less steps than are shown or described herein and may include these steps in a different order than the order described in the following example embodiments.

Referring to FIG. 4, at step 402, the method 400 may commence. At step 404, the method 400 may include outputting, by the processor 244, a first notification to a user interface (e.g., the mobile device 212 or the infotainment system 240) to place the markers 305 in the parking facility 105 (e.g., at a vehicle parking slot periphery or boundary). In some aspects, the processor 244 may determine positions/locations to dispose the markers 305 and may transmit information associated with the positions/locations to the user interface.

At step 406, the method 400 may include outputting, by the processor 244, a second notification to a user interface to manually park the vehicle 202 in the parking facility 105. At step 408, the method 400 may include detecting, by the processor 244 (e.g., via the detection unit), the markers 305 during vehicle parking maneuver. For example, the processor 244 may monitor presence, position, and orientation of the markers 305 relative to the vehicle 202 when the vehicle operator manually parks the vehicle 202. In some aspects, the processor 244 may store the information described above associated with the markers 305 in the memory 246.

At step 410, the method 400 may include monitoring, by the processor 244, vehicle movements during manual park maneuver and storing the information associated with the vehicle movements in the memory 246. For example, the processor 244 may monitor vehicle movement pattern such as multiple vehicle positions to park the vehicle 202 in the parking facility 105. At step 412, the method 400 may include monitoring, by the processor 244, inputs from other sensors (that may be part of the vehicle sensory system 234) during manual park maneuver and storing the information associated with the other sensors in the memory 246.

Responsive to storing the information described above, the processor 244 may use the stored information in the future to autonomously park the vehicle 202 in the parking facility 105 as described above in conjunction with FIG. 2.

The method 400 may end at step 414.

Figure 5:
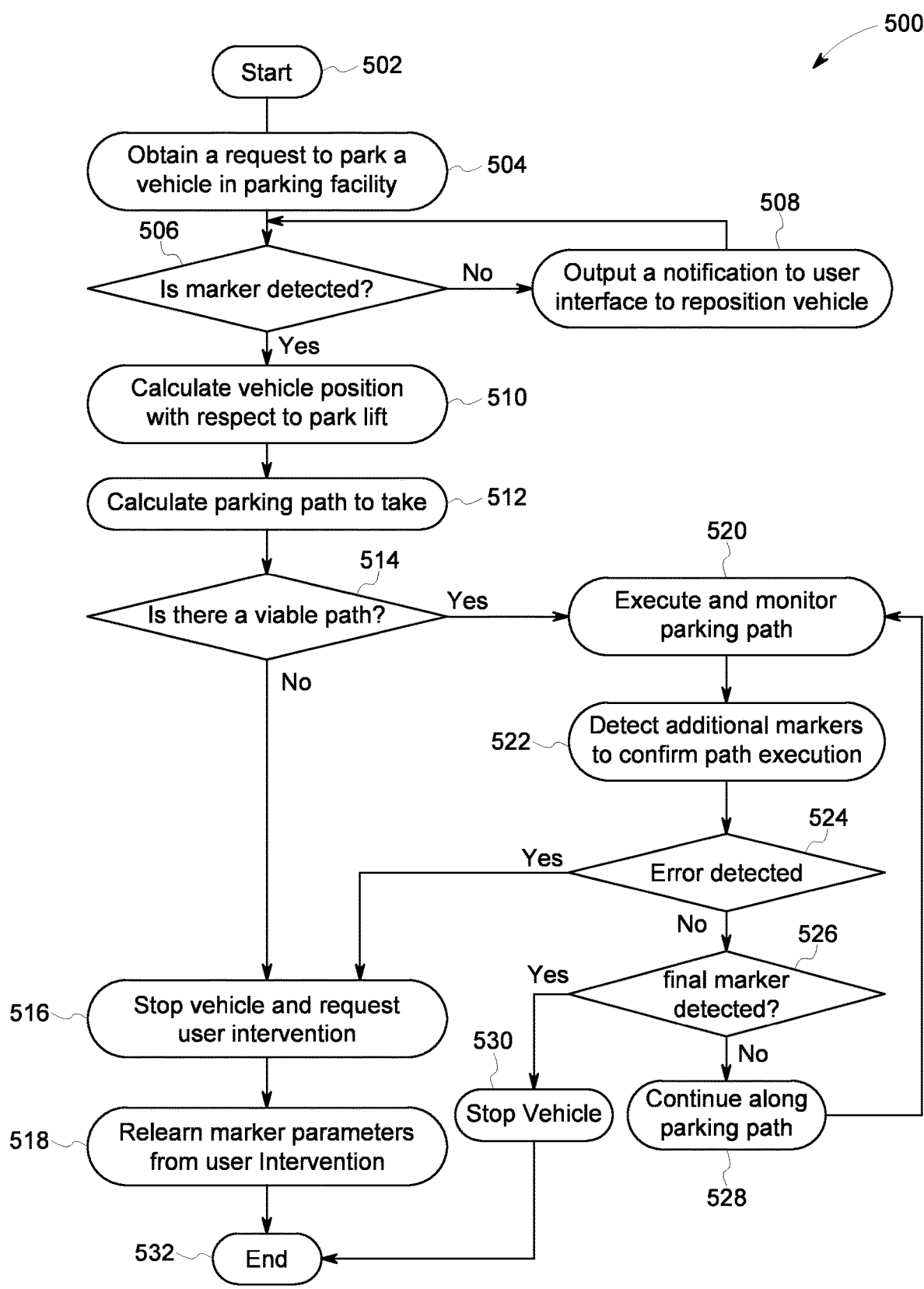
FIG. 5 depicts a flow diagram of a second method for providing vehicle parking assistance in accordance with the present disclosure.

FIG. 5 depicts a flow diagram of a second example method 500 for providing vehicle parking assistance, in accordance with the present disclosure. Specifically, FIG. 5 describes a parking assistance process after the learning process described above in conjunction with FIG. 4 is complete (i.e., when the processor 244 generates the trained model described above in conjunction with FIG. 2). FIG. 5 may be described with continued reference to prior figures, including FIGS. 1-4. The following process is exemplary and not confined to the steps described hereafter. Moreover, alternative embodiments may include more or less steps than are shown or described herein and may include these steps in a different order than the order described in the following example embodiments.

At step 502, the method 500 may commence. At step 504, the method 500 may include obtaining, by the processor 244, a request to park the vehicle 202 in the parking facility 105. In some aspects, the processor 244 may obtain the request from the mobile device 212, the infotainment system 240, and/or the like.

At step 506, the method 500 may include determining, by the processor 244, whether a marker is detected. When the marker is not detected, the method 500 moves to step 508. At step 508, the method 500 may include outputting, by the processor 244, a notification to a user interface (e.g., the mobile device 212 or the infotainment system 240) requesting the user/vehicle operator to reposition the vehicle 202.

When the vehicle 202 may be repositioned, the method 500 may move back to the step 506.

On the other hand, when the marker is detected at step 506, the method 500 moves to step 510. At step 510, the method 500 may include calculating, by the processor 244, a vehicle position with respect to the parking facility/lift 105 (or with respect to the detected marker). At step 512, the method 500 may include calculating, by the processor 244, a parking path to take to park the vehicle 202 in the parking facility 105.

At step 514, the method 500 may include determining, by the processor 244, whether the parking path is a viable path. Responsive to a determination that the parking path is not a viable path, the method 500 moves to step 516. At step 516, the method 500 may include stopping, by the processor 244, the vehicle 202 and requesting the vehicle operator to manually park the vehicle 202 in the parking facility 105. At step 518, the method 500 may include re-learning, by the processor 244, marker parameters (e.g., position/orientation) when the vehicle operator manually parks the vehicle 202.

On the other hand, responsive to a determination that the parking path is a viable path, the method 500 moves to step 520. At step 520, the method 500 may include executing and monitoring, by the processor 244, the viable path. At step 522, the method 500 may include detecting, by the processor 244, additional markers to confirm path execution. At step 524, the method 500 may include determining, by the processor 244, if any error is detected in executing the viable path. Responsive to a determination that the error is detected, the method 500 may move to the step 516.

On the other hand, when no error is detected at the step 524, the method 500 may move to step 526. At step 526, the method may include determining, by the processor 244, whether the final marker (i.e., the rear marker 305e or 305f)) has been detected. When the final marker is not detected, the method 500 may move to step 528. At step 528, the method 500 may include moving, by the processor 244, the vehicle 202 along the parking path. The method 500 may then move back to step 520. On the other hand, when the final marker is detected at the step 526, the method 500 may move to step 530. At step 530, the method 500 may include stopping, by the processor 244, the vehicle 202 at the parking facility 105. At this step, the vehicle 202 may be parked at the parking facility 105.

The method 500 may end at step 532.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A vehicle parking assist system comprising:
a detection unit configured to detect real-time presence, position, and orientation of a plurality of markers disposed on a parking space with respect to a vehicle;
a memory configured to store a historical vehicle movement pattern associated with the vehicle relative to the plurality of markers to park the vehicle in the parking space; and
a processor communicatively coupled to the detection unit and the memory, wherein the processor is configured to:
obtain a request to park the vehicle in the parking space;
obtain the historical vehicle movement pattern from the memory responsive to obtaining the request;
obtain real-time inputs from the detection unit responsive to obtaining the request; and
cause a vehicle movement to park the vehicle in the parking space based on the historical vehicle movement pattern and the real-time inputs.

2. The vehicle parking assist system of claim 1, wherein the historical vehicle movement pattern comprises historical presence, position, and orientation of the plurality of markers with respect to the vehicle while parking the vehicle in the parking space.

3. The vehicle parking assist system of claim 2, wherein the processor is further configured to:
compare the real-time presence, position, and orientation of the plurality of markers with the historical presence, position, and orientation of the plurality of markers; and
cause, based on comparing the real-time presence, position, and orientation of the plurality of markers with the historical presence, position, and orientation of the plurality of markers, the vehicle movement.

4. The vehicle parking assist system of claim 1, wherein each marker is associated with a unique pattern.

5. The vehicle parking assist system of claim 1, wherein the processor is further configured to:
determine positions of the plurality of markers to be placed in the parking space; and
transmit information associated with the positions to a user interface.

6. The vehicle parking assist system of claim 1, wherein the processor is further configured to:
estimate a vehicle position and a vehicle orientation with respect to the plurality of markers based on the real-time inputs obtained from the detection unit; and
cause the vehicle movement based on the estimation.

7. The vehicle parking assist system of claim 1, wherein the detection unit is a vehicle camera.

8. The vehicle parking assist system of claim 1, wherein the vehicle parking assist system is part of the vehicle.

9. The vehicle parking assist system of claim 1, wherein the processor is further configured to:
detect a presence of an object in proximity to the vehicle during the vehicle movement based on the real-time inputs obtained from the detection unit; and
update, based on detecting the presence of the object in proximity to the vehicle during the vehicle movement based on the real-time inputs obtained from the detection unit, the vehicle movement.

10. The vehicle parking assist system of claim 1, wherein the processor is further configured to:
determine that a predetermined condition is met during the vehicle movement; and
transmit a first notification to a user device to provide additional user inputs to park the vehicle in the parking space when the predetermined condition is met.

11. The vehicle parking assist system of claim 10, wherein the predetermined condition is met when the vehicle parking assist system is unable to park the vehicle in the parking space based on the historical vehicle movement pattern.

12. The vehicle parking assist system of claim 10, wherein the processor is further configured to transmit a second notification to the user device to dispose additional markers on the parking space when the predetermined condition is met.

13. A method to provide vehicle parking assistance comprising:
obtaining, by a processor, a request to park a vehicle in a parking space;
obtaining, by the processor, a historical vehicle movement pattern responsive to obtaining the request, wherein the historical vehicle movement pattern is associated with the vehicle relative to a plurality of markers, disposed on the parking space, to park the vehicle in the parking space;
obtaining, by the processor, real-time inputs from a detection unit responsive to obtaining the request, wherein the real-time inputs comprise real-time presence, position, and orientation of the plurality of markers with respect to the vehicle; and
causing, by the processor, a vehicle movement to park the vehicle in the parking space based on the historical vehicle movement pattern and the real-time inputs.

14. The method of claim 13, wherein the historical vehicle movement pattern comprises historical presence, position, and orientation of the plurality of markers with respect to the vehicle while parking the vehicle in the parking space.

15. The method of claim 14 further comprising:
comparing the real-time presence, position, and orientation of the plurality of markers with the historical presence, position, and orientation of the plurality of markers; and
causing, based on comparing the real-time presence, position, and orientation of the plurality of markers with the historical presence, position, and orientation of the plurality of markers, the vehicle movement.

16. The method of claim 13, wherein each marker is associated with a unique pattern.

17. The method of claim 13 further comprising:
determining positions of the plurality of markers to be placed in the parking space; and
transmitting information associated with the positions to a user interface.

18. The method of claim 13 further comprising:
estimating a vehicle position and a vehicle orientation with respect to the plurality of markers based on the real-time inputs obtained from the detection unit; and
causing the vehicle movement based on the estimation.

19. The method of claim 13 further comprising:
determining that a predetermined condition is met during the vehicle movement; and
transmitting a notification to a user device to provide additional user inputs to park the vehicle in the parking space when the predetermined condition is met.

20. A non-transitory computer-readable storage medium having instructions stored thereupon which, when executed by a processor, cause the processor to:
obtain a request to park a vehicle in a parking space;
obtain a historical vehicle movement pattern responsive to obtaining the request, wherein the historical vehicle movement pattern is associated with the vehicle relative to a plurality of markers, disposed on the parking space, to park the vehicle in the parking space;

obtain real-time inputs responsive to obtaining the request, wherein the real-time inputs comprise real-time presence, position, and orientation of the plurality of markers with respect to the vehicle; and cause a vehicle movement to park the vehicle in the parking space based on the historical vehicle movement pattern and the real-time inputs.

* * * * *